United States Patent
Andersson

(10) Patent No.: US 9,081,390 B2
(45) Date of Patent: Jul. 14, 2015

(54) BACK PRESSURE VALVE

(71) Applicant: Flomatic Corporation, Glens Falls, NY (US)

(72) Inventor: Allan Bo Andersson, Cambridge, NY (US)

(73) Assignee: FLOMATIC CORPORATION, Glen Falls, NY (US)

( * ) Notice: Subject to any disclaimer, the term of this patent is extended or adjusted under 35 U.S.C. 154(b) by 219 days.

(21) Appl. No.: 13/803,586

(22) Filed: Mar. 14, 2013

(65) Prior Publication Data

US 2014/0261785 A1  Sep. 18, 2014

(51) Int. Cl.
*F16K 31/12* (2006.01)
*G05D 16/06* (2006.01)

(52) U.S. Cl.
CPC ....... *G05D 16/0658* (2013.01); *Y10T 137/7793* (2015.04)

(58) Field of Classification Search
CPC . F16K 17/04; F16K 17/0446; F16K 17/0466; F16K 3/02; G05D 16/0688; G05D 16/0658; Y10T 137/7793
USPC ............. 137/484.6, 484.8, 505.13, 505.15, 137/505.26, 505.29, 505.36, 505.47, 137/505.22; 251/333, 343–344
See application file for complete search history.

(56) References Cited

U.S. PATENT DOCUMENTS

| | | | | |
|---|---|---|---|---|
| 959,397 | A * | 5/1910 | Simmons | 137/466 |
| 1,646,640 | A * | 10/1927 | Daniel | 251/24 |
| 1,729,819 | A * | 10/1929 | Campbell | 137/505 |
| 2,329,323 | A * | 9/1943 | Benz | 222/40 |
| 2,833,304 | A * | 5/1958 | Fish | 137/495 |
| 2,854,025 | A * | 9/1958 | Terry | 137/505.13 |
| 5,722,454 | A * | 3/1998 | Smith et al. | 137/503 |
| 6,866,061 | B2 | 3/2005 | Ye et al. | |
| 8,240,327 | B2 * | 8/2012 | Hawkins et al. | 137/489.5 |
| 2003/0178065 | A1 * | 9/2003 | Gagnon | 137/505.26 |
| 2004/0183044 | A1 * | 9/2004 | Wears | 251/206 |
| 2008/0110506 | A1 * | 5/2008 | Igarashi | 137/488 |
| 2010/0243081 | A1 * | 9/2010 | Zecchi et al. | 137/505.36 |

\* cited by examiner

*Primary Examiner* — Jessica Cahill
(74) *Attorney, Agent, or Firm* — Heslin Rothenberg Farley & Mesiti P.C.

(57) ABSTRACT

A back pressure valve comprises a pressure regulator housing affixed to a pressure controller housing and a diaphragm disposed between the pressure regulator housing and the pressure controller housing. In one aspect, the back pressure valve includes a valve member moveable between a fully open position and a fully closed position. The pressure regulator housing includes an inlet chamber communicating with an outlet chamber through at least one fluid passage in a sleeve. The valve member includes a stem connected to a valve head. The valve head includes an outer surface that is received and guided during movement by an inner surface of the sleeve. Upper and lower outer surface of the valve head provide stability to the valve member during opening and closing of the back pressure valve.

3 Claims, 4 Drawing Sheets

BACK PRESSURE VALVE

BACKGROUND

This invention relates generally to the field of valves, and more specifically to back pressure valves.

BRIEF SUMMARY

Back pressure valves are designed to regulate a minimum pre-set upstream or inlet pressure to an un-regulated downstream or outlet pressure regardless of water flow. Conventional back pressure valves have a valve that comprises a flexible diaphragm that is resiliently urged against a valve seat. Diaphragm back pressure valves apply positive discharge pressure to a pump system to prevent siphoning and eliminate varying dosage rates caused by fluctuating downstream pressure. The diaphragm is held against a valve seat by the force of an internal spring. When the preset pressure is exceeded, the diaphragm is forced up and system fluid flows through the valve to the injection point. However, a high pressure differential is required to operate conventional back pressure valve to overcome the force from the spring that biases the valve in the closed position. As a result, conventional back pressure are not responsive to small changes in pressure and the valve components tend to wear faster.

SUMMARY OF THE INVENTION

The shortcomings of the prior art are overcome and additional advantages are provided through use of a back pressure valve constructed in accordance with one or more principles of the present invention.

In one aspect of the invention, there is provided a back pressure valve comprising a pressure regulator housing, a pressure controller housing, a diaphragm and a valve member. The pressure regulator housing defines an inlet chamber and an outlet chamber. The inlet chamber is in communication with the outlet chamber through a sleeve. The sleeve includes an inner surface and defines at least one passage through the inner surface between the inlet chamber and outlet chamber. The pressure controller housing is affixed to the pressure regulator housing. The pressure controller housing comprises a spring. The diaphragm is disposed between and separates the pressure controller housing and the pressure regulator housing. The pressure regulator housing includes a sensing port that extends between the inlet chamber and a chamber formed below the diaphragm. Movement of the diaphragm is determined by pressure in the chamber through the sensing port from the inlet chamber. The valve member is moveably disposed in the inlet chamber of said pressure regulator housing for controlling fluid flow between the inlet chamber and the outlet chamber through the at least one passage in the sleeve. The valve member is resiliently biased in a closed position by the spring to prevent fluid from flowing through the at least one passage in the inner surface of the sleeve. The valve member includes a valve stem and a valve head. The valve head includes an outer surface having an upper outer surface and a lower outer surface. The outer surface defines a cavity between the upper outer surface and the lower outer surface. The cavity is adapted to receive a sealing member. At least a portion of the lower outer surface of the valve head is slidably received by and faces the inner surface of the sleeve as the valve member moves between an opened position and the closed position.

In another aspect of the invention, the inner surface of the sleeve includes an annular seat member. The sealing element engages the annular seat member and cavity walls of the cavity formed in said valve head in the closed position Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Figure 1:
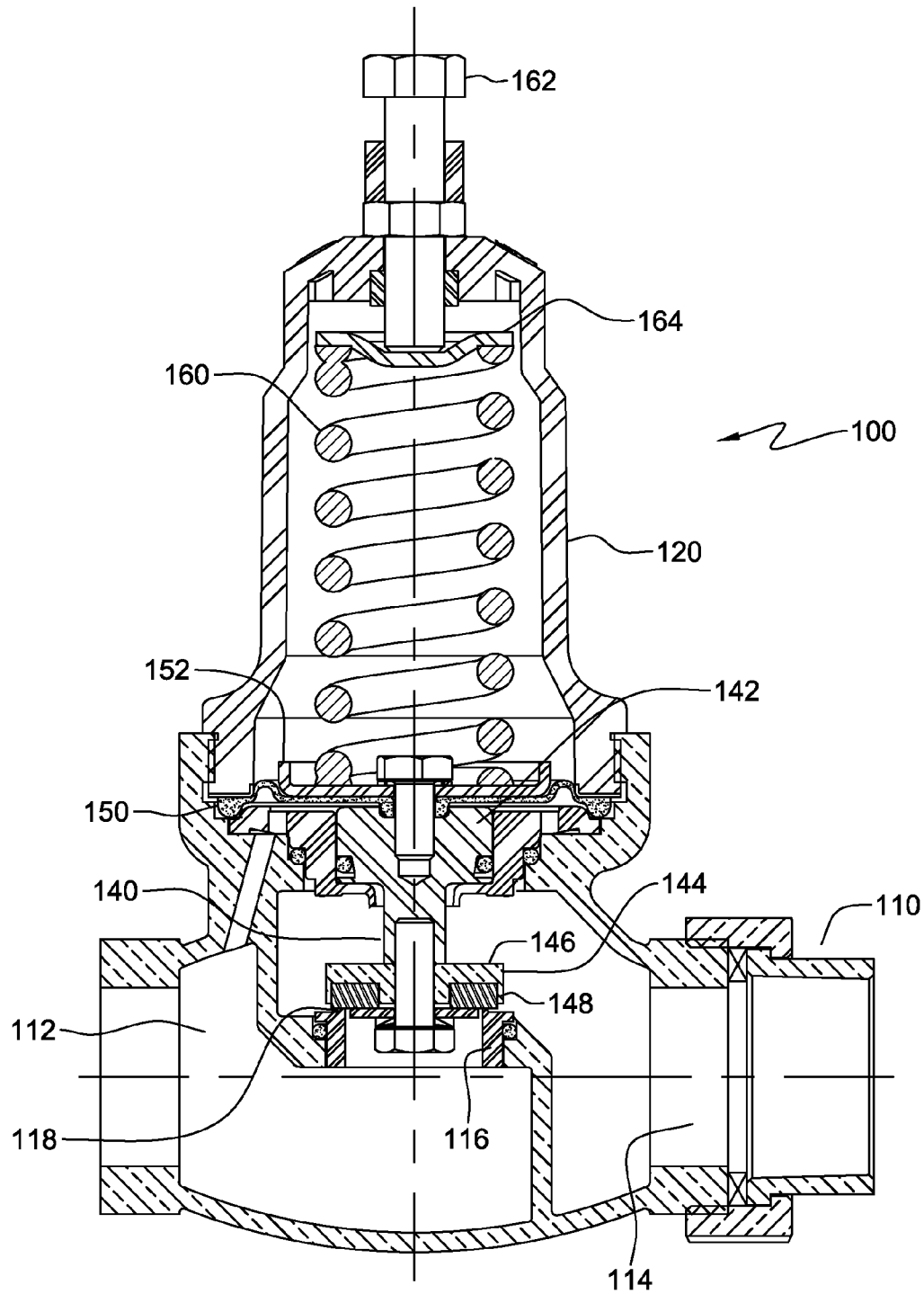
FIG. 1 depicts a sectional view of a conventional back pressure valve.

For the purposes of promoting an understanding of the principles of a valve designed and constructed in accordance with one or more aspects of the present invention, reference will now be made to the embodiments, or examples, illustrated in the drawings and specific language will be used to describe these. It will nevertheless be understood that no limitation of the scope of the invention is thereby intended. Any alterations and further modifications in the described embodiments, and any further applications of the principles of the invention as described herein are contemplated as would normally occur to one skilled in the art to which the back pressure valve relates.

FIG. 1 illustrates a conventional back pressure valve 100. As illustrated in FIG. 1, a conventional back pressure valve 100 has a pressure regulator housing 110, a pressure controller housing 120 and a flexible diaphragm 150 disposed between pressure controller housing 120 and pressure regulator housing 110. During operation, the valve may be substantially vertical position, with the pressure controller housing on top of the pressure regulator housing. Alternatively, the valve may also be placed in any non-vertical positions, including horizontal position.

Pressure regulator housing 110 has an inlet chamber 112 defining an inlet and an outlet chamber 114 defining an outlet. Inlet chamber 112 is in fluid communication with outlet chamber 114 through a fluid passage defined by sleeve 116. Sleeve 116 includes a circular shoulder forming a valve seat 118 at the end of sleeve 116 facing inlet chamber 112. An upper end of pressure regulator housing 110 is affixed to a lower end of pressure controller housing 120. Diaphragm 150 extends between a diaphragm plate 152 and a valve plunger 140. Diaphragm 150 provides a seal between pressure regulator housing 110 and pressure controller housing 120.

An adjustable spring 160 is provided within pressure controller housing 120. Adjustable spring 160 is capable of adjusting a load on diaphragm plate 152, which in turn provides a load on diaphragm 150 and valve plunger 140. Adjustable spring 160 is adjustable by, for example, manually turning an adjusting screw 162 that applies tension on spring 160 by, for example, a spring button 164.

Valve plunger 140 is housed within pressure controller housing 110. In conventional back pressure valves, valve plunger 140 extends downward towards a valve seat 118 defined on sleeve 116. Valve plunger 140 is moveable between a fully open position and a fully closed position depending on the pressure differential in the back pressure valve and the load provided by adjustable spring 160. Valve plunger 140 includes a stem 142 affixed to a plunger 144 by, for example, a fastener such as, for example, a screw. Stem 142 is affixed to diaphragm plate 152 by, for example, a fastener such as, for example, a screw, with diaphragm 150 in between. Plunger 144 includes a valve head 146 having a rubber disc 148. The diameter of valve head 146 and rubber disc 148 of plunger 144 in conventional back pressure valves is larger than the diameter of valve seat 118. In a fully closed position, rubber disc 148 is compressed and biased against valve seat 118 by the load provided by adjustable spring 160 to prevent fluid flowing between inlet chamber 112 and outlet chamber 114. Valve seat 118 is typically tapered and rubber disc 148 is captured from three sides against valve seat 118 with a mechanical seat stop. For fluid to flow, the pressure differential within the valve between inlet chamber 112 and outlet chamber 114 must be high enough to displace rubber disc 148 away from the valve seat 118 by overcoming the load provided by adjustable spring 160.

A back pressure valve constructed in accordance with one or more aspects of the present invention significantly decreases the pressure differential required to operate the back pressure valve to overcome the force used to bias the valve in the closed position provided by, for example, an adjustable spring. As a result, for example, a back pressure valve constructed in accordance with one or more aspects of the present invention will be more responsive to changes in pressure, operate in a smoother fashion, and cause less wear on valve components.

Figure 2:
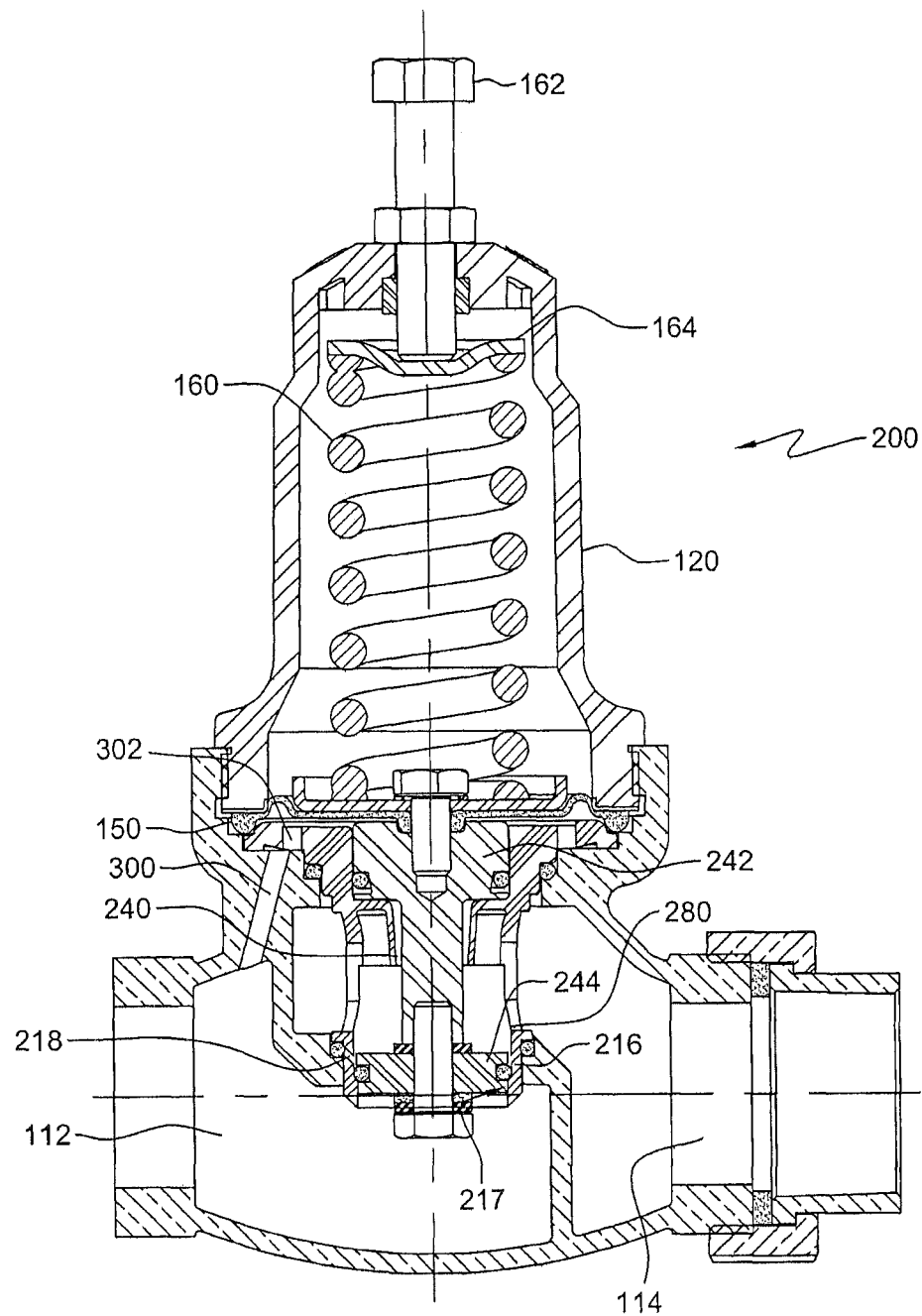
FIG. 2 depicts a longitudinal sectional view of one embodiment of a back pressure valve in accordance with one or more principles of the present invention in a closed position.

By way of example, FIG. 2 depicts a back pressure valve 200 constructed in accordance with one or more aspects of the present invention. Back pressure valve 200 depicted in FIG. 2 includes a sleeve 216 including an inner surface 217. Sleeve 216 defines at least one fluid passage 218 in inner surface 217 that allows fluid to pass between inlet chamber 112 and outlet chamber 114 when back pressure valve 200 is in an open position.

In one embodiment, back pressure valve 200 includes a plunger 240 slidably fitted into sleeve 216 and moveable between a fully open position and a fully closed position. Plunger 240 includes a stem 242 and a valve head 244 having an outer surface 245. Outer surface 245 of valve head 244 faces or confronts inner surface 217 of sleeve 216 during opening and closing of back pressure valve 200. The diameter of outer surface 245 of valve head 244 is smaller than the diameter of inner surface 217 of sleeve 216. Inner surface 217 of sleeve 216 provides guidance of valve head 244 as valve head 244 moves up and down from a fully open position to a fully closed position. In one embodiment, valve head 244 may include the same outer diameter as stem 242.

Figure 4:
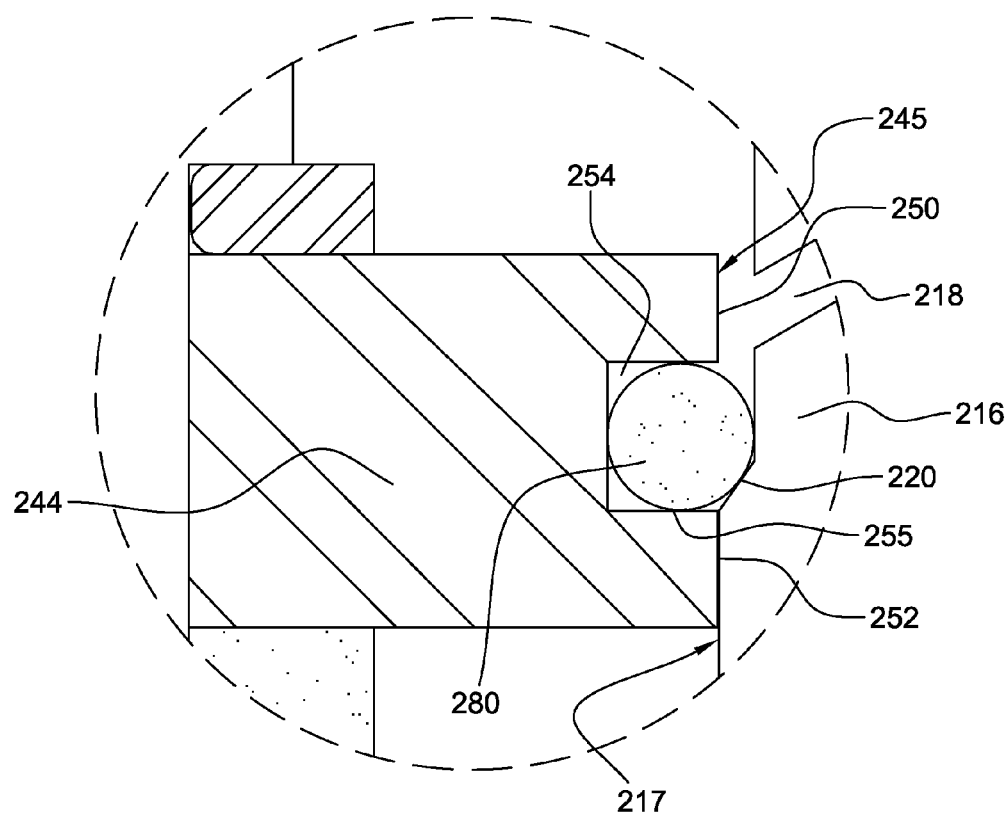
FIG. 4 depicts a partial sectional view of one embodiment of a back pressure valve in accordance with one or more principles of the present invention in a closed position.

In one embodiment, depicted in FIG. 4 outer surface 245 of valve head 244 includes an upper outer surface 250, a lower outer surface 252, and an annular cavity or chamber 254 defined by a cavity wall 255. Annular cavity or chamber 254 includes an opening adapted to receive and contain a sealing element 280. Sealing element 280 may be, for example, an o-ring. In one example, lower outer surface 252 faces or confronts and is guided by inner surface 217 of sleeve 216 as valve head 244 moves from a fully closed position to a fully open position.

FIG. 2 illustrates one embodiment of a back pressure valve constructed in accordance with one or more principles of the present invention in a closed position. As shown in FIG. 2, valve head 244 prevents fluid from passing between inlet chamber 112 and outlet chamber 114 through the at least one fluid passage 218 in inner surface 217 of sleeve 216. In this embodiment, depicted in FIG. 4 both upper and lower outer surfaces 250 and 252 of outer surface 245 of valve head 244 face or confront inner surface 217 of sleeve 216. Sealing element 280 is in contact with inner surface 217 and cavity wall 255 to form a water-tight seal below fluid passage(s) 218. Fluid cannot pass beyond sealing element 280 and valve head 244 through any fluid passage 218 defined in inner surface 217 of sleeve 216 when sealing element 280 is in contact with inner surface 217 of sleeve 216 and cavity wall 255 below fluid passage(s) 218.

Contrary to conventional back pressure valves, sealing element 280 is not compressed by the full force of adjustable spring 160 against an annular valve seat like valve seat 118 shown in FIG. 1. In contrast, sealing element 280 contacts inner surface 217 of sleeve 216 during closing to prevent fluid from passing from inlet chamber 112 and outlet chamber 114. In contrast to conventional back pressure valves, back pressure valve 200 provides a sealing surface along inner surface 217 of sleeve 216 and cavity wall 255 in valve head 244 rather than on a circular shoulder on top of a sleeve. A sealing surface along inner surface 217 is, for example, more responsive to changes in pressure and provides less surface engagement and allows the valve to operate smoother than conventional back pressure valves. In conventional back pressure valves, a rubber disc is compressed against a valve seat over a larger engagement surface which requires a higher pressure differential to operate the valve. A back pressure valve constructed in accordance with one or more principles of the present invention requires less engagement surface and, in turn, less pressure differential to open and close the valve.

In one embodiment, as illustrated in FIG. 4, inner surface 217 may include an annular seat member 220 positioned below fluid passage(s) 218 and closer to inlet chamber 112. Annular seat member 220 extends radially inwardly from inner surface 217 of sleeve 216. In a fully closed position, sealing element 280 abuts against annular seat member 220 to provide, for example, sealing at the engagement of annular seat member 220 and within chamber 254 in both horizontal directions and in both vertical directions. When sealing member 280 abuts against annular seat member 220, the inlet chamber is isolated from fluid passage(s) 218 in inner surface 217 of sleeve 216. Annular seat member 220 also provides, for example, relief to sealing element 280 as valve head 244 moves from a fully closed position requiring less friction during operation of back pressure valve 200.

Figure 3:
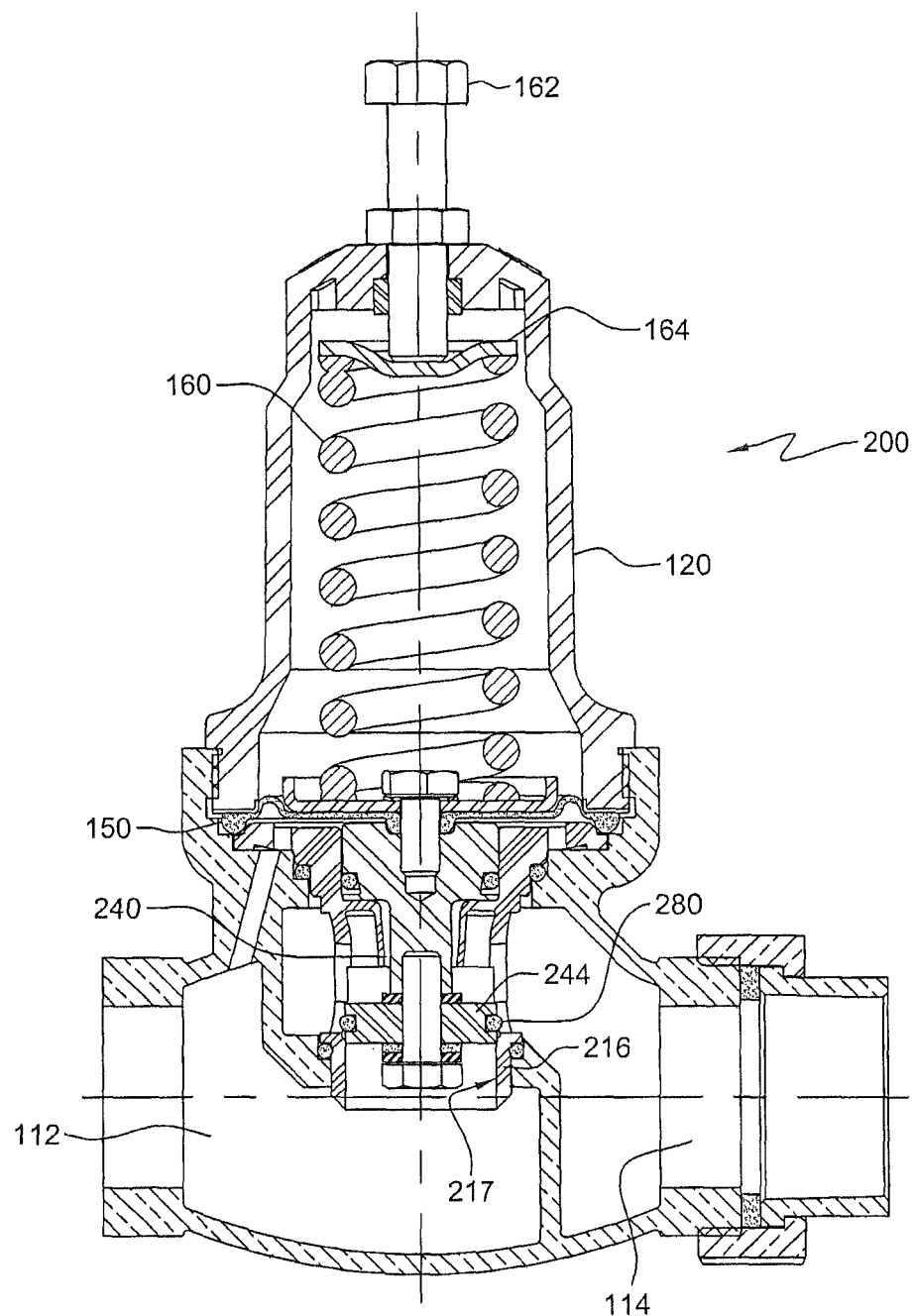
FIG. 3 depicts a longitudinal sectional view of one embodiment of a back pressure valve in accordance with one or more principles of the present invention in an open position.

In one embodiment, as illustrated in FIGS. 2 and 3, back pressure valve 200 includes an upstream sensing port 300. Upstream sensing port 300 extends between inlet chamber 112 to a chamber 302 formed below diaphragm 150. Chamber 302 and inlet chamber 112 are in fluid communication through upstream sensing port 300. In operation, the pressure in inlet chamber 112 is the same as the pressure in chamber 302 underneath diaphragm 440150. For back pressure valve 200 to open, the pressure in inlet chamber 112, which is the same as the pressure in chamber 302 must overcome the set spring tension of adjustable spring 160 to move diaphragm 150 up and compress adjustable spring 160 as adjustable spring 160 compresses, diaphragm plate 152 moves up, which in turn, moves valve plunger 240 with valve head 244 up to allow fluid to pass through passage(s) 218. In other words, pressure in the inlet chamber determines the pressure required to move diaphragm plate 152 and, in turn, valve plunger 240.

As the force exerted by water pressure in back pressure valve 200 overcomes the force biasing the valve closed by, for example, adjustable spring 160, valve head 244 moves along and is guided by inner surface 217 of sleeve 216 towards an open position. As valve head 244 moves from a fully closed position, as shown in FIG. 2, to a fully open position, as illustrated by example in FIG. 3, inner surface 217 of sleeve 216 guides the movement of upper and lower outer surfaces 250 and 252, providing additional stability in the movement of valve head 244 and the operation of back pressure valve 200. In one embodiment, at least a portion of lower outer surface 252 of outer surface 245 faces or confronts inner surface 217 of sleeve 216 at all times during the opening and closing of the valve. In contrast, valve head 144 of a conventional back pressure valve, as shown in FIG. 1, completely disengages from valve seat 118 into outlet chamber 114.

In conventional back pressure valves, the full force of adjustable spring 160 is applied against valve seat 118 though rubber disc 148. Since rubber disc 148 is compressed against valve seat 118 by the full force of adjustable spring 160 in a conventional back pressure valve, a larger pressure differential is required to operate the valve than a back pressure valve constructed in accordance with one or more principles of the present invention that uses less sealing surface and, therefore, requires less pressure differential to make the valve open and close because the full force of an adjustable spring is not applied to a valve seat in a fully closed position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A back pressure valve, said back pressure valve comprising:
   a pressure regulator housing, said pressure regulator housing defining an inlet chamber and an outlet chamber, wherein the inlet chamber is in communication with the outlet chamber through a sleeve, the sleeve including an inner surface, an inlet end proximate the inlet chamber, and a second end, wherein the inner surface of the sleeve includes an annular seat member, the inner surface of the sleeve between the annular seat member and the inlet end of the sleeve extending radially inward relative to the inner surface of the sleeve between the annular seat member and the second end, the sleeve defining at least one passage through the inner surface between the inlet chamber and outlet chamber, the at least one passage in communication with the outlet chamber of said pressure regulator housing, wherein the annular seat member is between the at least one passage and the inlet end of the sleeve;
   a pressure controller housing, said pressure controller housing affixed to said pressure regulator housing, said pressure controller housing comprising a spring;
   a diaphragm, said diaphragm disposed between and separating said pressure controller housing and said pressure regulator housing, wherein said pressure regulator housing includes a sensing port, the sensing port extending between the inlet chamber and a chamber formed below said diaphragm, wherein movement of said diaphragm is determined by pressure in the chamber through the sensing port from the inlet chamber;
   a valve member, said valve member moveably disposed in the inlet chamber of said pressure regulator housing for controlling fluid flow between the inlet chamber and the outlet chamber through the at least one passage in the sleeve, the valve member being resiliently biased in a closed position against the annular seat member by the spring to prevent fluid from flowing through the at least one passage in the inner surface of the sleeve, said valve member including a valve stem and a valve head, the valve head including an outer peripheral surface, the outer peripheral surface having an upper outer peripheral surface and a lower outer peripheral surface, wherein the outer peripheral surface defines a cavity between the upper outer peripheral surface and the lower outer peripheral surface, the cavity adapted to receive a sealing member, the sealing member engaging the annular seat member and cavity walls of the cavity formed in the valve head in the closed position, wherein at least a portion of the lower outer peripheral surface of the valve head is substantially parallel to the inner surface of the sleeve between the annular seat member and the inlet end of the sleeve, wherein the lower outer peripheral surface of the valve head is slidably received and partially contacting so as to be guided by the inner surface of the sleeve between the annular seat member and the inlet end of the sleeve as said valve member moves between an opened position and the closed position.

2. The back pressure valve of claim 1, wherein the sealing member is an o-ring.

3. The back pressure valve of claim 1, wherein the inner surface of the sleeve includes an upper sleeve inner surface proximate an outlet end of the sleeve above the annular seat member and a lower sleeve inner surface proximate the inlet end of the sleeve below the annular seat member, wherein the lower outer peripheral surface of the valve head is slidably received and guided by the lower inner sleeve surface of the sleeve.

* * * * *